Sept. 13, 1949.                    J. S. SHARPE                        2,481,627
                                 TRANSMISSION UNIT
Filed Jan. 24, 1946                                              2 Sheets-Sheet 1

Inventor:
John S. Sharpe
by his Attorneys
Howson & Howson

Sept. 13, 1949.   J. S. SHARPE   2,481,627
TRANSMISSION UNIT

Filed Jan. 24, 1946   2 Sheets-Sheet 2

Inventor:-
John S. Sharpe
by his Attorneys
Howson & Howson

Patented Sept. 13, 1949

2,481,627

UNITED STATES PATENT OFFICE 2,481,627

TRANSMISSION UNIT

John S. Sharpe, Haverford, Pa.; Catharine D. Sharpe, executrix of the estate of said John S. Sharpe, deceased, assignor to The Franklin Institute of the State of Pennsylvania for the Promotion of the Mechanic Arts, Philadelphia, Pa., a corporation Application January 24, 1946, Serial No. 643,040

2 Claims. (Cl. 74—804)

This invention relates to transmission devices, and a primary object of the invention is to provide a transmission unit of novel and desirable structural and functional characteristics.

A more specific object of the invention is to provide a reverse gear unit of compact, rugged, and relatively simple form affording a direct drive connection between the input and output ends of the unit, together with a reverse drive of the same or different ratio as may be required.

Figure 1:
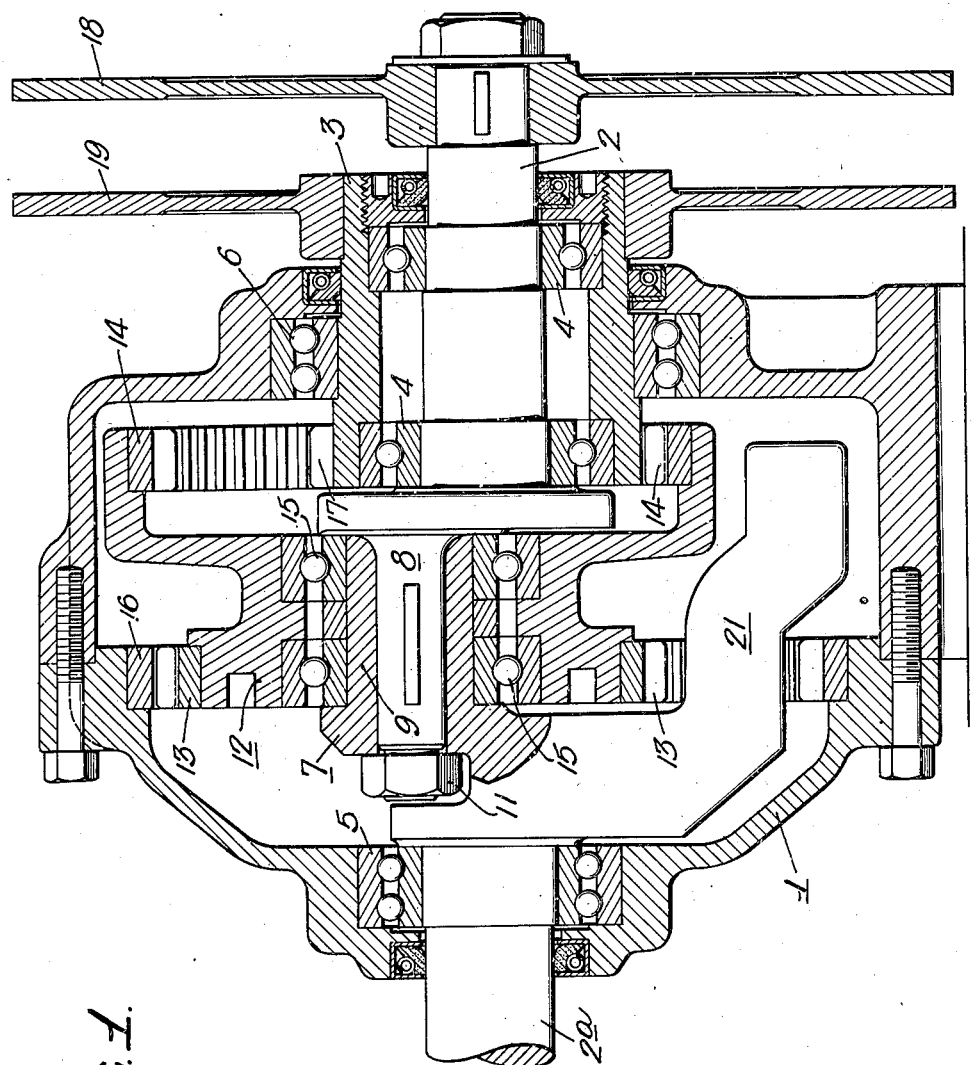
Fig. 1 is a sectional view of a preferred embodiment of my invention.

With reference to Fig. 1, the unit therein illustrated comprises a relatively fixed casing 1 within which is journaled a pair of shaft elements 2 and 3 respectively. The element 2 is journaled at one end in bearings 4—4 and at the other end in a bearing 5. The element 3, which is coaxial with the element 2 and embraces the latter, is journaled in part upon the bearings 4—4 and in part upon a bearing 6. In this matter the shaft elements 2 and 3 find a mutual support in the bearings 4 and a common support in the housing through the medium of the bearing 6.

In the present instance the shaft 2 extends continuously through the unit and, intermediate its ends, includes a crank 7. The shaft is made in two longitudinal sections of which one section comprises a pin element 8 and the other section a sleeve 9 which receives the pin 8 as illustrated to form the crank 7. The two parts are united by a nut 11 which is applied to the threaded extremity of the pin 8 and which seats against an end surface of the sleeve 9.

Journaled on the crank 7 is a planetary element 12 in the form in the present instance of a composite gear including an external element 13 and an internal element 14. Anti-friction bearings 15 are provided between the crank 7 and the composite gear. Obviously since the composite element 12 is journaled on the shaft for rotation about an axis eccentric to the shaft axis, rotation of the shaft will cause the gear to move in an orbital path concentric with the shaft.

The gear 13 meshes with an internal gear 16 on the casing 1; and the internal gear 14 meshes with a gear 17 secured to the inner end of the shaft 3. In the present instance each of the shafts 2 and 3 is provided with a clutch, 18 and 19 respectively, by means of which these shafts may be connected selectively to a source of power, or to driven elements, as the case may be.

In operation and assuming that power is applied through the clutch 18 to the shaft 2, the clutch 19 being disengaged, the power will be transmitted directly through the shaft 2, and if the power is withdrawn from the other end 2a of the shaft 2, the speed ratio at the input and output ends of the unit is necessarily one to one. If it is desired to reverse the direction of rotation of the shaft, the clutch 18 is disengaged and the clutch 19 engaged, with the result that the drive is through the shaft 3 and pinion 17 to the internal gear 14. The gear 13 of the composite element 12 then reacts with the relatively fixed internal gear 16 to turn the shaft 2, on which the element 12 is journaled as described, in the reverse direction and at the same one to one ratio. The speed ratio in this instance is a function of the relative diameters of the gears 17, 14, 13, and 16 and may be varied by exchanging the gears, in pairs, for others of differing size.

With further reference to this embodiment of the invention, it is to be noted that the device is susceptible to accurate balancing, both static and dynamic, and to this end the shaft 2 is provided with a counterweight 21 which balances the crank 7 as well as the centrifugal effect of the composite gear 12.

Figure 2:
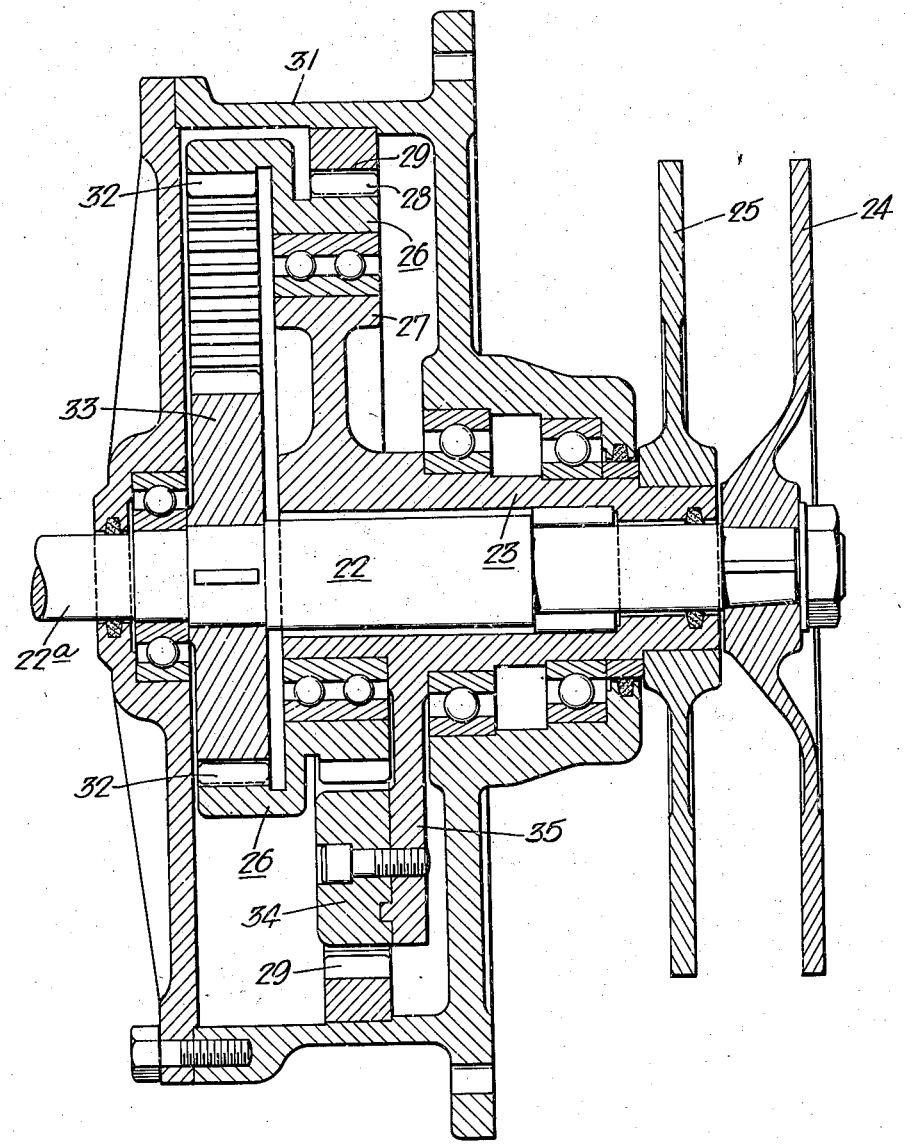
Fig. 2 is a sectional view illustrating a modification within the scope of the invention.

The embodiment of the invention shown in Fig. 2, comprises shafts 22 and 23 which correspond to the shafts 2 and 3 of the previously described embodiment. Similarly, the shafts are provided with clutches, 24 and 25 respectively. In this instance the composite gear 26 is journaled on an eccentric 27 on the shaft 23, said gear being thereby movable in an orbital path eccentric to the common axis of the shafts 22 and 23. The gear element 28 of the composite gear 26 meshes with an internal gear 29 on a part 31 of the relatively fixed structure of the unit. The internal gear element 32 of the composite gear 26 meshes with a gear 33 secured to the shaft 22. The eccentric 27 is counterbalanced in this instance by a counterweight 34 on an arm 35 of the shaft 23.

In operation, if the clutch 24 is engaged so as to connect the shaft 22 with a source of power, power being withdrawn from the other end 22a of the shaft 22, the input to output ratio of the unit is unity, there being a direct drive through said shaft. If the clutch 25 is engaged, the drive is through the shaft 23 and eccentric 27 to the composite gear 26, said gear reacting with the relatively fixed internal gear 29 to drive the gear 33 through the internal gear element 32. The shaft 22 in this case will be rotated in the reverse direction at approximately the same one to one ratio.

It is to be noted that in each embodiment, if one of the coaxial shafts is driven in one direction, the other shaft will be driven in the opposite direction; and with the gear ratios shown the rotation of the shafts will be at the same rate. Also, if power is applied to the end 2a of the shaft 2, or to the end 22a of the shaft 22, the shafts 3 and 23 will be rotated in the opposite direction and at the same rate. In this latter respect the unit may be used as a fixed ratio split contra-drive.

I claim:

1. In a reverse gear unit, a shaft one end of which constitutes the output element of the unit, a second shaft coaxial with and embracing the shaft first-named, a composite planetary gear journaled eccentrically on said first-named shaft for movement in a planetary path concentric with the shaft axis, a relatively fixed gear meshing with a gear element of said planetary, a gear on said second shaft meshing with another gear element of said planetary, and means for applying power to said shafts selectively to thereby effect a selective rotation of the output shaft in opposite directions.

2. In a reverse gear unit, a shaft one end of which constitutes the output element of the unit, a second shaft coaxial with an embracing the shaft first-named, a composite planetary gear having internal and external toothed elements journaled eccentrically on said first-named shaft for movement in a planetary path concentric with the shaft axis, a relatively fixed internal gear meshing with an external gear element of said planetary, a gear on said second shaft meshing with an internal gear element of said planetary, and means for applying power to said shafts selectively to thereby effect a selective rotation of the output shaft in opposite directions.

JOHN S. SHARPE.

REFERENCES CITED

The following references are of record in the file of this patent:

UNITED STATES PATENTS

| Number | Name | Date |
|---|---|---|
| 2,170,733 | Sharpe | Aug. 22, 1939 |
| 2,206,958 | Humphrey | July 9, 1940 |

FOREIGN PATENTS

| Number | Country | Date |
|---|---|---|
| 452,641 | Great Britain | Nov. 15, 1927 |
| 579,067 | France | Oct. 9, 1924 |